(12) United States Patent
Speldrich et al.

(10) Patent No.: US 10,429,222 B2
(45) Date of Patent: Oct. 1, 2019

(54) FLOW CHANNEL FOR LAMINARIZING FLOW IN FLOW SENSOR

(71) Applicant: Honeywell International Inc., Morris Plains, NJ (US)

(72) Inventors: Jamie Speldrich, Freeport, IL (US); Brian Speldrich, Freeport, IL (US)

(73) Assignee: Honeywell International Inc., Morris Plains, NJ (US)

( * ) Notice: Subject to any disclaimer, the term of this patent is extended or adjusted under 35 U.S.C. 154(b) by 349 days.

(21) Appl. No.: 15/383,774

(22) Filed: Dec. 19, 2016

(65) Prior Publication Data
US 2018/0172493 A1     Jun. 21, 2018

(51) Int. Cl.
| | | |
|---|---|---|
| *G01F 15/14* | (2006.01) | |
| *G01F 1/68* | (2006.01) | |
| *G01F 1/684* | (2006.01) | |
| *G01F 15/00* | (2006.01) | |
| *G01F 1/692* | (2006.01) | |

(52) U.S. Cl.
CPC .......... *G01F 1/6842* (2013.01); *G01F 15/00* (2013.01); *G01F 1/692* (2013.01)

(58) Field of Classification Search
CPC .......... G01F 1/6842; G01F 1/692; G01F 1/68; G01F 15/00; G01F 5/00
See application file for complete search history.

(56) References Cited

U.S. PATENT DOCUMENTS

| | | | | |
|---|---|---|---|---|
| 6,981,410 B2* | 1/2006 | Seki | ...................... | G01F 1/6845 73/204.26 |
| 7,637,152 B2* | 12/2009 | Ushigusa | .................. | G01F 1/42 137/458 |
| 8,899,108 B2* | 12/2014 | Speldrich | .................. | F17D 1/00 73/204.21 |
| 9,003,877 B2* | 4/2015 | Qasimi | ................. | G01F 1/6842 73/204.22 |
| 2011/0226052 A1* | 9/2011 | Speldrich | ............... | B01D 17/10 73/204.22 |
| 2011/0226053 A1* | 9/2011 | Sorenson | ............... | B01D 17/10 73/204.23 |
| 2015/0027558 A1* | 1/2015 | Kehoe | ................... | G01F 1/6965 137/15.01 |

* cited by examiner

*Primary Examiner* — Harshad R Patel
*Assistant Examiner* — Nigel H Plumb
(74) *Attorney, Agent, or Firm* — Seager, Tufte & Wickhem LLP

(57) ABSTRACT

Embodiments relate generally to a system comprising a flow sensor assembly. The flow sensor assembly includes a housing defining a flow channel. The flow channel has an inlet serpentine portion fluidly coupled to an inlet port, and an outlet serpentine portion fluidly coupled to an outlet port. The housing further defines a sensor chamber fluidly coupling the inlet serpentine portion to the outlet serpentine portion, where the sensor chamber has a split planar region. The flow sensor assembly further includes a sensor die located proximate to the split planar region and configured to sense a measure related to a flow rate of a fluid.

20 Claims, 5 Drawing Sheets

FLOW CHANNEL FOR LAMINARIZING FLOW IN FLOW SENSOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Sensors are used in a wide variety of applications including residential, industrial, automotive, military, medical, aeronautical, space, as well as other applications. A flow sensor is used for measuring a flow rate of a fluid, for example a liquid fluid or a gas fluid. There is an ongoing industry demand for further miniaturization of sensors including further miniaturization of flow sensors. The process of miniaturization of sensors often creates new problems that were not known in larger scale sensor implementations.

SUMMARY

In an embodiment, a flow sensor assembly is disclosed. In an embodiment, the flow sensor assembly comprises a housing defining a flow channel and a sensor die. The flow channel comprises an inlet port, an outlet port, an inlet serpentine portion of the flow channel fluidly coupling to the inlet port, an outlet serpentine portion of the flow channel fluidly coupling to the outlet port, and a sensor chamber fluidly coupling the inlet serpentine portion of the flow channel to the outlet serpentine portion of the flow channel. The sensor chamber defines a planar region, an inlet ramp that transitions between a bottom of an inlet of the sensor chamber to a spit portion of the planar region, an outlet ramp that transitions between a bottom of an outlet of the sensor chamber to the spit portion of the planar region, side walls between the inlet ramp and the planar region, side walls between the outlet ramp and the planar region, and where the sensor chamber is at least 3 times as wide as a width of the inlet serpentine portion of the flow channel and at least 3 times as wide as a width of the outlet serpentine portion of the flow channel. The sensor die is located proximate to the spit of the sensor chamber and is configured to sense a measure related to a flow rate of a fluid flowing through the flow channel.

In another embodiment, a flow sensor assembly is disclosed. The flow sensor assembly comprises a housing defining a flow channel and a sensor die. The flow channel comprises an inlet port, an outlet port, an inlet serpentine portion of the flow channel fluidly coupling to the inlet port, an outlet serpentine portion of the flow channel fluidly coupling to the outlet port, and a sensor chamber fluidly coupling the inlet serpentine portion of the flow channel to the outlet serpentine portion of the flow channel. The sensor chamber defines a planar region, an inlet ramp that transitions between a bottom of an inlet of the sensor chamber to a spit portion of the planar region, an outlet ramp that transitions between a bottom of an outlet of the sensor chamber to the spit portion of the planar region, side walls between the inlet ramp and the planar region, side walls between the outlet ramp and the planar region, where the sensor chamber is at least 3 times as wide as a width of the inlet serpentine portion of the flow channel and at least 3 times as wide as a width of the outlet serpentine portion of the flow channel, where an inlet portion and an outlet portion of the sensor chamber each define a radius at least 1.5 times the width of the inlet serpentine portion of the flow channel and the width of the outlet serpentine portion of the flow channel. The sensor die is located proximate to the spit of the planar region and is configured to sense a measure related to a flow rate of a fluid flowing through the flow channel.

In yet another embodiment, a flow sensor assembly is disclosed. The flow sensor assembly comprises a housing defining a flow channel and a sensor die. The flow channel comprises an inlet port, an outlet port, an inlet serpentine portion of the flow channel fluidly coupling to the inlet port, an outlet serpentine portion of the flow channel fluidly coupling to the outlet port, and a sensor chamber fluidly coupling the inlet serpentine portion of the flow channel to the outlet serpentine portion of the flow channel. The sensor chamber defines a planar region, an inlet ramp that transitions between a bottom of an inlet of the sensor chamber to a spit portion of the planar region, an outlet ramp that transitions between a bottom of an outlet of the sensor chamber to the spit portion of the planar region, side walls between the inlet ramp and the planar region, and side walls between the outlet ramp and the planar region. The sensor chamber is at least 3 times as wide as a width of the inlet serpentine portion of the flow channel and at least 3 times as wide as a width of the outlet serpentine portion of the flow channel, and the only flow path between the inlet port and the outlet port is via the sensor chamber. The sensor die is located proximate to the spit of the sensor chamber and is configured to sense a measure related to a flow rate of a fluid flowing through the flow channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
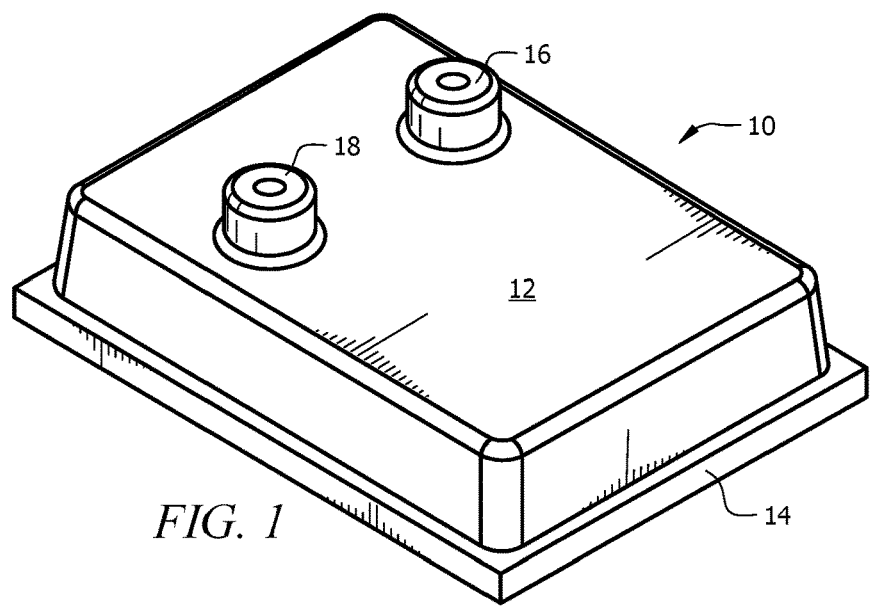
FIG. 1 is a perspective view of a flow sensor according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a small flow sensor that promotes laminarizing flow. In the past, small flow sensors may have had problems achieving a sufficiently strong sensor response to fluid flow, which resulted in an undesirable low signal-to-noise ratio (SNR). These same flow sensors may have had problems with non-laminarized flow (i.e., turbulent flow) at high flow rates, which resulted in an undesirable non-monotonic sensor output at these high flow rates. The small flow sensor taught herein is thought to solve or reduce the severity of these previous problems by employing an inclined plane bounded by walls, in the flow channel leading into a chamber housing the flow sensor, that acts as a laminizer to guide the fluid flow around a corner in the fluid flow path and that additionally boosts signal strength by confining the bulk of the fluid flow proximate to the flow sensor.

In an embodiment, the flow sensor is about 8 millimeters wide by 12 millimeters long. When flow sensors are reduced in size to this scale, it becomes a challenge to maintain a laminarized flow of fluid past the flow sensor semiconductor. For example, a short fluid flow path and/or sharply radiused corners in the fluid flow path may create eddies in the fluid flow that interfere with accurately transducing the fluid flow to an electrical indication. For example, the electrical signal strength may be low in amplitude, resulting in a low signal-to-noise ratio (SNR). For example, over the range of flow rates, the electrical signal may not be monotonic.

As is known to one skilled in the art, laminarized fluid flow may be said to flow in sheets, to be smooth and constant. Non-laminarized fluid flow may be said to be turbulent and/or to comprise randomized flow. The degree of laminarization can be quantified with a dimensionless measure known as the Reynolds number. The Reynolds number is proportional to the product of the density of the fluid, the velocity of the fluid, and the diameter of the fluid flow channel and is inversely proportional to the viscosity of the fluid (i.e., the product above divided by the viscosity of the fluid). The lower the Reynolds number, the more laminarized the fluid flow. In general, long fluid flow paths contribute to achieving more laminarized fluid flows. But achieving long fluid paths in small fluid sensors can become a challenge.

The fluid flow sensor taught herein achieves laminarized fluid flow and increased signal strength by relying upon a plurality of different but complementary refinements. In different embodiments different combinations of these individual refinements may be used. In some embodiments, only one of the refinements may be employed. In an embodiment, the length of the fluid flow channel is increased by employing serpentine channels. In an embodiment, a radius of a turn in the fluid flow path as it approaches the flow sensor die is increased, whereby to decrease the likelihood of eddies and/or turbulence occurring in the fluid flow. In an embodiment, the fluid flow path opens up in a sensor chamber of the fluid flow path, an inlet ramp having side walls, and an outlet ramp having side walls that channel the fluid flow more towards a central part of the sensor chamber, close to where the fluid sensor is positioned. These refinements are discussed further with reference to drawings herein below.

Turning now to FIG. 1, a sensor 10 is described. In an embodiment, the sensor 10 comprises a housing 12 and a circuit board 14. The housing 12 defines a fluid inlet port 16 and a fluid outlet port 18. It will be appreciated that which port 16, 18 operates as an inlet port and which port operates as an outlet port may be reversed in some embodiments, and the sensor 10 may be capable of sensing a flow rate in either direction. In an embodiment, a reversal of the inlet-outlet orientation may be associated with a corresponding reversal of the physical orientation of a flow sensor die relative to the fluid flow path in the sensor 10 or reversal of the processing of the electrical values output by the flow sensor die. In an embodiment, the housing 12 may be cemented or sealed to the circuit board 14.

Figure 2:
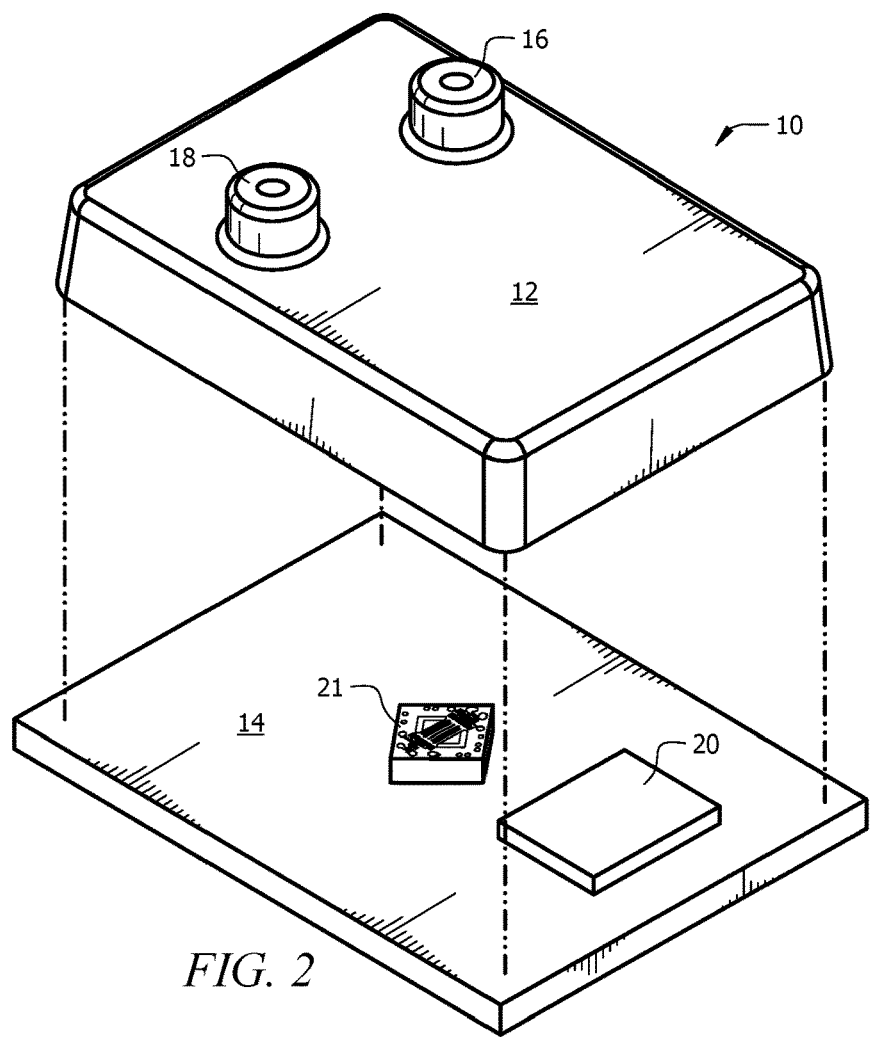
FIG. 2 is an exploded perspective view of a flow sensor according to an embodiment of the disclosure.

Turning now to FIG. 2, an exploded view of the sensor 10 is described. The sensor 10 further comprises an electric circuit 20 and a flow sensor die 21 communicatively coupled to each other on the circuit board 14. The circuit 20 may comprise circuit elements to condition an output signal of the flow sensor die 21 and to generate therefrom a digital output representing a fluid flow rate. For example, one or more circuit elements may amplify the output of the flow sensor die 21, filter the output to reduce noise, to convert the signal from an analog value to a digital value, to correct the signal for offset and non-linearity, and to scale to a desirable flow rate unit system. The circuit elements may comprise one or more logic components such as an application specific integrated circuit (ASIC), a field programmable gate array (FPGA), a complex programmable logic device (CPLD), a digital signal processor (DSP), a microprocessor, a microcontroller, or other logical component. The circuit elements may comprise capacitors, resistors, operational amplifiers, and analog-to-digital converters.

Figure 3A:
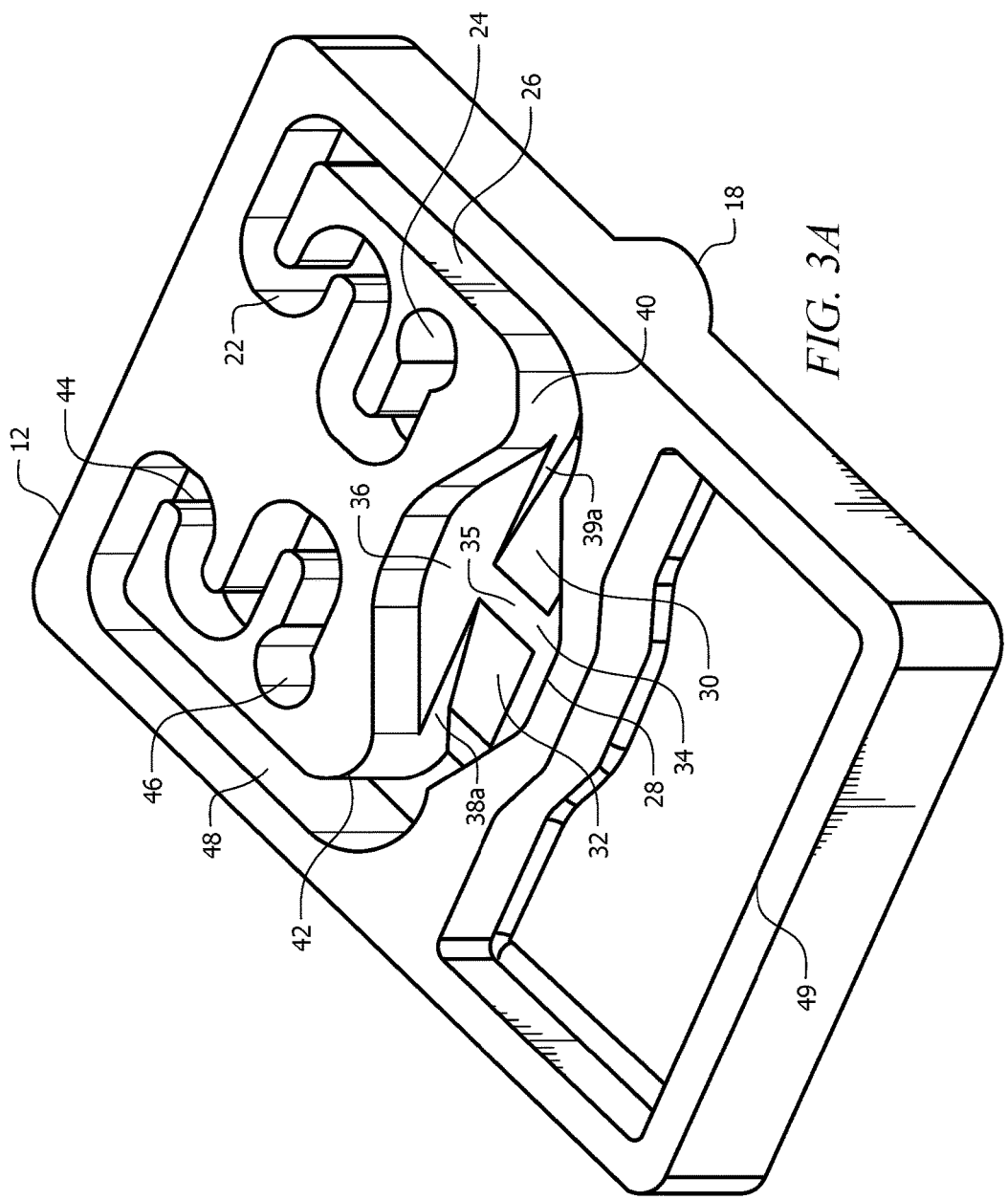
FIG. 3A is a perspective view of an interior of a housing of a flow sensor according to an embodiment of the disclosure.

Turning now to FIG. 3A, an interior of the housing 12 is described. In an embodiment, the interior of the housing 12 defines a plurality of features that may promote achieving a laminarized fluid flow proximate to the flow sensor die 21 and to achieving a strong signal at the flow sensor die 21 (i.e., an increased signal-to-noise ratio (SNR)). Note that some of the features illustrated in FIG. 3A may be better seen in FIG. 4 discussed below. The housing 12 defines a flow channel that is completed or closed when the housing 12 is adhered to or sealed to the circuit board 14. The flow channel may comprise the inlet port 16 (see FIG. 1 and FIG. 2), an inlet 46 fluidly coupled to the inlet port 16, an inlet serpentine portion 44 of the flow channel fluidly coupled to the inlet 46, an inlet straight portion 48 of the flow channel fluidly coupled to the inlet serpentine portion 44, an inlet ramp comprising a first inlet ramp portion 33 (see FIG. 4) and a second inlet ramp portion 32, a first planar region 34, a second planar region 36, and a spit planar region 35 located between and in substantially the same plane as the first planar region 34 and the second planar region 36. The combination of the inlet serpentine portion 44 and the inlet straight portion 48 may be referred to in some contexts as an inlet portion.

A first transition portion 50 of the flow path may fluidly couple the inlet straight portion 48 to the first inlet ramp portion 33. In an embodiment, the first transition portion 50 expands from a width of the inlet straight portion 48 to about two times the width of the inlet straight portion 48. Said in other words, the first transition portion 50 has a width at one end (where it meets the inlet straight portion 48) about equal to the width of the inlet serpentine portion 44 and a width at its other end (where it meets the first inlet ramp portion 33) about equal to two times the width of the inlet serpentine portion 44.

The flow channel may further comprise an outlet ramp comprising a first outlet ramp portion 31 and a second outlet ramp portion 30, an outlet straight portion 26 of the flow channel, an outlet serpentine portion 22 of the flow channel fluidly coupled to the outlet straight portion 26, an outlet 24 fluidly coupled to the outlet serpentine portion 22, and the outlet port 18 fluidly coupled to the outlet 24. The combination of the outlet serpentine portion 22 and the outlet straight portion 26 may be referred to in some contexts as an outlet portion. A second transition portion 49 of the flow path may fluidly couple the first outlet ramp portion 31 to the outlet straight portion 26. In an embodiment, the second transition portion 49 expands from a width of the outlet straight portion 26 to about two times the width of the outlet straight portion 26. Said in other words, the second transition portion 49 has a width at one end (where it meets the outlet straight portion 26) about equal to the width of the outlet serpentine portion 22 and a width at its other end (where it meets the first outlet ramp portion 31) about equal to two times the width of the outlet serpentine portion 22.

The inlet ramp, the outlet ramp, the spit planar region 36, the first planar region 34, and the second planar region 36 may be said to comprise a sensor chamber 28 of the flow channel. An inlet of the sensor chamber 28 (i.e., the first inlet ramp portion 33) is fluidly coupled to the inlet straight portion 48 (i.e., opposite the coupling between the inlet straight portion 48 and the inlet serpentine portion 44). An outlet of the sensor chamber 28 (i.e., the first outlet ramp portion 31) is fluidly coupled to the outlet straight portion 26 (i.e., opposite the coupling between the outlet straight portion 26 and the outlet serpentine portion 22).

Figure 3B:
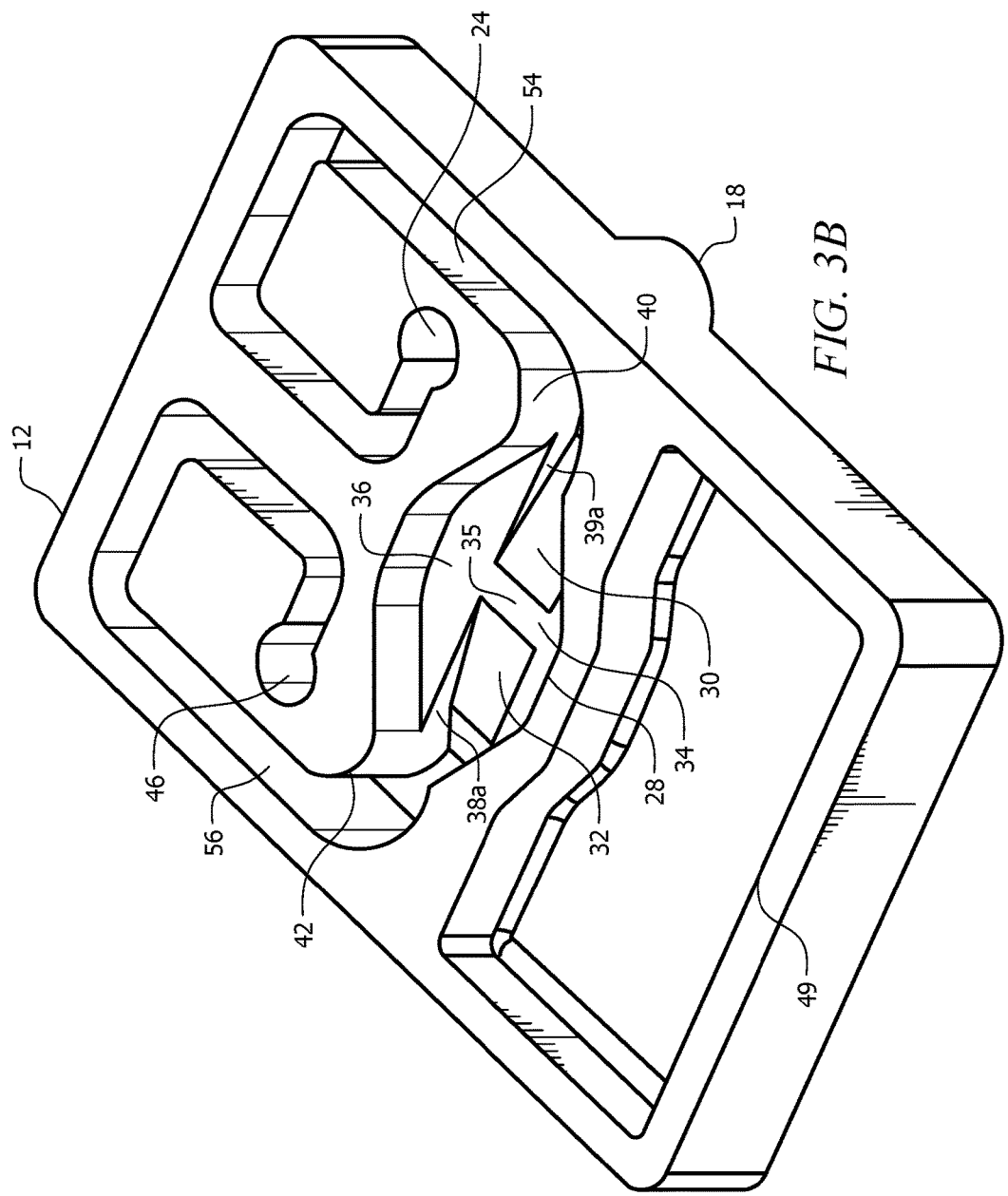
FIG. 3B is a perspective view of an interior of a housing of a flow sensor according to an embodiment of the disclosure.

Turning now to FIG. 3B, an alternative embodiment of the housing is described. The details of the housing 12 depicted in FIG. 3B are substantially similar to those illustrated in and described above with reference to FIG. 3A, with the exception that the inlet serpentine portion 44 and inlet straight portion 48 are replaced by an inlet portion 56 and the outlet serpentine portion 22 and outlet straight portion 26 are replaced by an outlet portion 54. Each of the inlet portion 56 and the outlet portion 54 may be said to be non-serpentine portions or flow path portions. The flow sensor 10 taught herein may feature a housing 12 that comprises an inlet portion that is non-serpentine or that has a serpentine portion. The flow sensor 10 taught herein may feature a housing that comprises an outlet portion that is non-serpentine or that has a serpentine portion.

Figure 4:
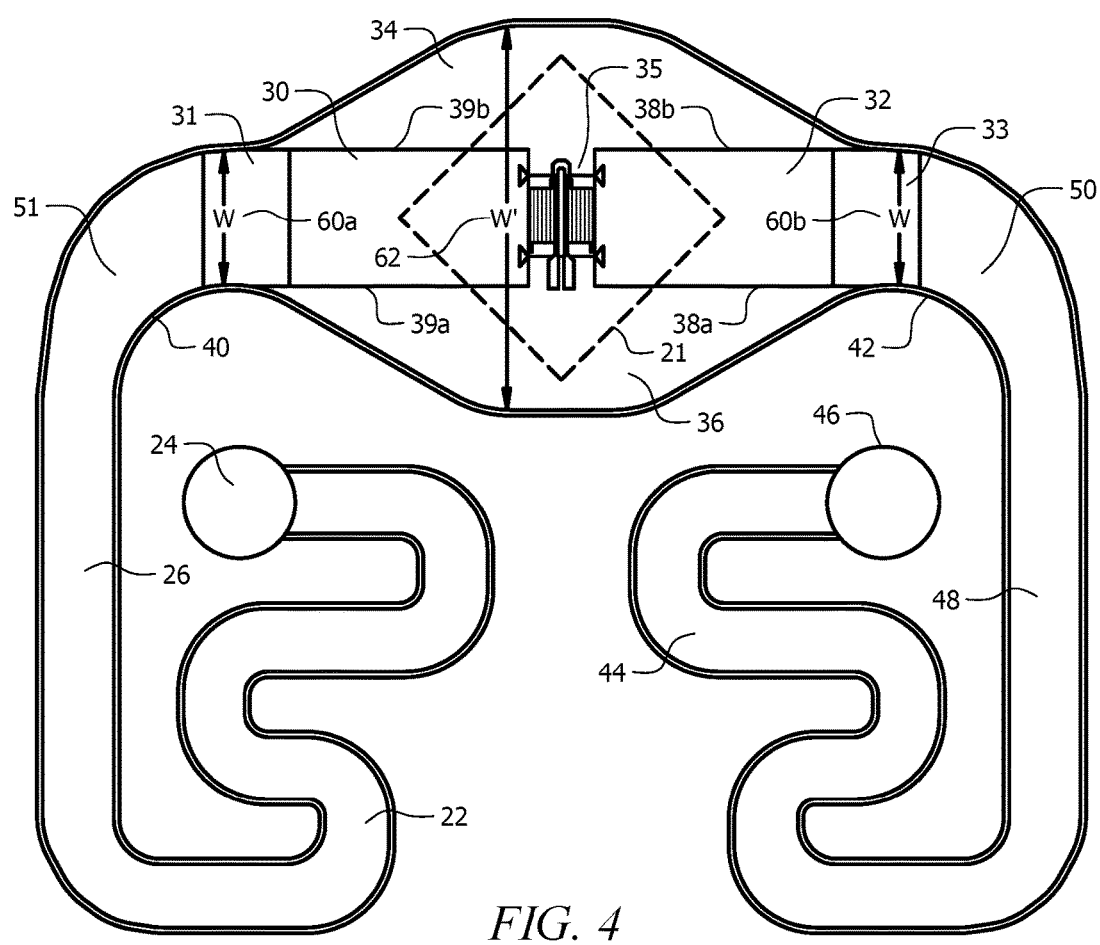
FIG. 4 is a plan view of an interior of a housing of a flow sensor according to an embodiment of the disclosure.

With reference now to FIG. 4, in an embodiment, the transition between the serpentine portions of the flow channel to the sensor chamber 28 define a large radius, whereby laminarized fluid flow is promoted and the likelihood of eddies and/or turbulence in the fluid flow are reduced. For example, a first radius 42 is located where the inlet straight portion 48 transitions to the sensor chamber 28, and a second radius 40 is located where the sensor chamber 28 transitions to the outlet straight portion 26. In an embodiment, the radius of radii 40, 42 may be at least 1.5 times the width of the serpentine portions 26, 48 of the flow channel. In an embodiment, the radii 40, 42 may be at least 1/10 the width of the sensor 10. In an embodiment where the sensor 10 is about 8 millimeters wide, the radii 40, 42 may be at least 0.85 millimeters.

In an embodiment, a width W 60, where the straight portions 26, 48 meet the sensor chamber 28, is at least 2 times the width of the straight portions 26, 48. In an embodiment where the sensor 10 is about 8 millimeters wide and about 12 millimeters long, the inlet width W 60 is at least 1.1 millimeters wide. In an embodiment, the ramp portions 30, 31, 32, 33 are about the same width as the width W 60. In an embodiment, a sensor chamber width W' 62 (a width taken from a far side of the first planar region 34, across the spit 35, to the opposite side of the second planar region 36 is at least 5 times the width of the straight portions 26, 48. In an embodiment, the sensor chamber width W' 62 (a width taken from a far side of the first planar region 34, across the spit 35, to the opposite side of the second planar region 36 is at least 3 times the width of the straight portions 26, 48. In an embodiment, the depth of the serpentine portions 22, 44 and straight portions 26, 48 of the flow channel may be at least 2 times the width of the straight portions 26, 48. It is understood, however, in other embodiments, some of the dimensions and proportions of the flow channel described may be different from the above descriptions.

When the circuit board 14 is adhered to and/or sealed to the housing 12, the sensor die 21 is located over and/or proximate to the spit 35, as illustrated in ghosted format in FIG. 4. The sensor die 21 is rotated about 45 degrees with reference to the direction of fluid flow through the sensor chamber 28. Not wishing to be bound by theory, it is thought that the fluid flow from the inlet ramp to the spit 35 is confined by side walls (e.g., side walls 38a, 38b, 39a, 39b shown in FIG. 4 located between the inlet ramp and the outlet ramp and the planar regions 34, 36 and that this confinement, by concentrating the flow proximate to the sensor die 21, increases the flow rate signal output by the sensor die 21. This fluid flow confinement, further, is thought to contribute to monotonicity of sensor die 21 signal output relative to fluid flow rate. Said in other words, it is thought that the fluid confinement ensures that the sensor die 21 output signal strength monotonically increases with increased fluid flow rate.

Figure 5:
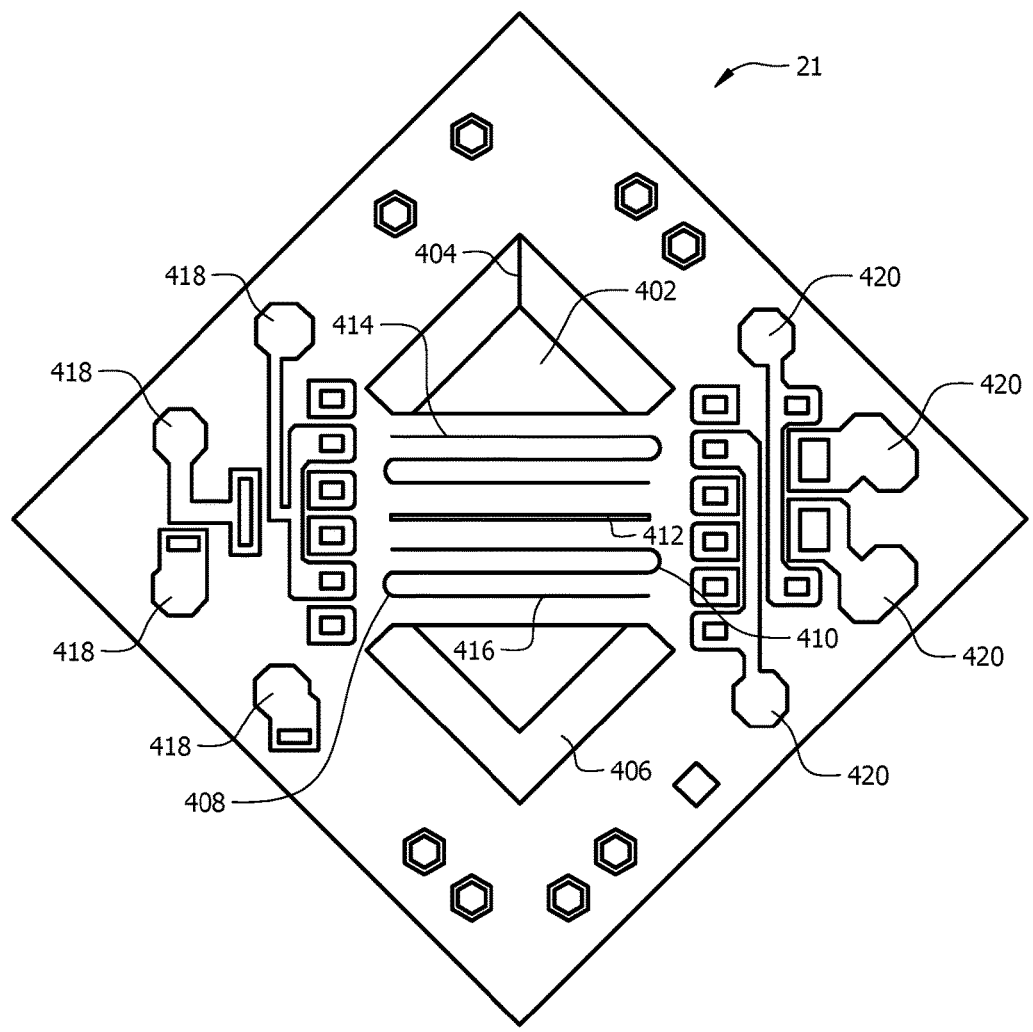
FIG. 5 is a block diagram of a flow sensor die according to an embodiment of the disclosure.

Turning now to FIG. 5, further details of the sensor die 21 are described. In an embodiment, the sensor die 21 components are described below, but it is understood that in other embodiments, the sensor die 21 may vary from the description below. The sensor die 21 may comprise a silicon substrate or another semiconductor material substrate. The die 21 may include a recess 402 that extends from a first recess end 404 to a second recess end 406, forming a bridge 408 that overlies the recess 402. The recess 402 may be formed using any suitable technique, including, but not limited to machining, laser cutting, or etching. It will be understood that at least a portion of the fluid passing through the sensor chamber 28 (e.g., from the inlet ramp to the outlet ramp and past the spit 35) will pass under the bridge 408. The fluid flow may flow over both sides of the bridge 408 in some circumstances. A sense element 410 may be disposed on the bridge 408. In this configuration, the bridge 408 and sense element 410 may be thermally coupled to the fluid. Also, the bridge 408 and sense element 410 may be relatively thermally isolated from the remainder of the sense die 21, for example in the vent that the sensor die 21 is a thermal anemometer type flow sensor. In some embodiments, the sense element 410 may take different forms based on different intended uses.

In some cases, the sense element may include a heater 412, a first temperature sensor 414 that is upstream of the heater 412 and a second temperature sensor 416 downstream of the heater 412. The temperature sensors 414, 416 may be resistors in some circumstances, for example resistors with high temperature coefficients to improve temperature difference determination. It will be appreciated that the reference of upstream versus downstream locations is relative and may be altered in different embodiments and possibly in the same embodiment. Said in other words, in an embodiment, fluid flow may be sensed in both directions by the same device, if the electrical values output by the sensor die 21 are interpreted, conditioned, and processed accordingly.

In some cases, the temperature sensors 414, 416 may be formed using thin film deposition or sputtering. In some cases, the temperature sensors 414, 416 may be silicide (Pt, Au, Pd, Mo, Ti, W, Hf, Zr, Cr, or combinations thereof) resistors. The temperature sensors 414, 416 may be formed of silicon, Permalloy, platinum, and/or Nichrome. In some embodiments, the temperature sensors 414, 416 may be provided in an extended, meandering path to extend the length for a given die area.

The sensor die 21 may include bond pads 418, 420 formed of materials such as silicon, gold, TiW, aluminum, aluminum-copper, and/or silver. The first number of bond pads 418 and the second number of bond pads 420 may be electrically coupled to one or more structures formed on, in, or under the bridge 408, such as the heater 412 or the temperature sensors 414, 416. Some of the wiring traces may be excluded to avoid cluttering the drawing. The bond pads 418, 420 may be used to electrically couple the sensor die 21 to other components on the circuit board 14.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A flow sensor assembly, comprising:
a housing defining a flow channel comprising
an inlet port,
an outlet port,
an inlet serpentine portion of the flow channel fluidly coupling to the inlet port,
an outlet serpentine portion of the flow channel fluidly coupling to the outlet port, and
a sensor chamber fluidly coupling the inlet serpentine portion of the flow channel to the outlet serpentine portion of the flow channel, where the sensor chamber defines:
a planar region comprising a first planar region, a second planar region, and a spit planar region, wherein the spit planar region is located between the first planar region and the second planar region, and wherein the spit planar region is in the same plane as that of the first planar region and the second planar region,
an inlet ramp that transitions between a bottom of an inlet of the sensor chamber to the spit planar region, an outlet ramp that transitions between a bottom of an outlet of the sensor chamber to the spit planar region, side walls between the inlet ramp and the planar region, side walls between the outlet ramp and the planar region, and where the sensor chamber is at least 3 times as wide as a width of the inlet serpentine portion of the flow channel and at least 3 times as wide as a width of the outlet serpentine portion of the flow channel; and
a sensor die located proximate to the spit planar region of the sensor chamber and configured to sense a measure related to a flow rate of a fluid flowing through the flow channel.

2. The flow sensor assembly of claim 1, further comprising a circuit board that is electrically coupled to the sensor die and sealingly coupled to the housing.

3. The flow sensor assembly of claim 2, further comprising an electrical circuit mechanically coupled to the circuit board and communicatively coupled to the sensor die and configured to output a fluid flow rate digital value.

4. The flow sensor assembly of claim 1, wherein a radius of a turn of the flow channel into the inlet ramp is at least 1.5 times the width of the inlet serpentine portion of the flow channel.

5. The flow sensor assembly of claim 1, wherein the sensor chamber is at least 5 times as wide as the width of the inlet serpentine portion of the flow channel.

6. The flow sensor assembly of claim 1, wherein the flow channel is configured to confine at least 95% of the fluid that enters the inlet port flows through the sensor chamber.

7. The flow sensor assembly of claim 1, wherein the flow channel further comprises an inlet straight portion that fluidly couples the inlet serpentine portion of the flow channel to the inlet ramp and an outlet straight portion that fluidly couples the outlet ramp to the outlet serpentine portion of the flow channel.

8. The flow sensor assembly of claim 7, wherein the flow channel further comprises a first coupling region that fluidly couples the inlet straight portion to the inlet ramp and a second coupling region that fluidly couples the outlet ramp to the outlet straight portion, where the width of the first coupling region where it joins the inlet ramp is about twice as wide as where it joins the inlet straight portion, and where the width of the second coupling region where it joins the outlet ramp is at least twice as wide as where it joins the outlet straight portion.

9. The flow sensor assembly of claim 1, wherein the inlet ramp and the outlet ramp are at least 2 times the width of the inlet serpentine portion of the flow channel.

10. A flow sensor assembly, comprising:
a housing defining a flow channel comprising:
an inlet port,
an outlet port,
an inlet serpentine portion of the flow channel fluidly coupling to the inlet port,
an outlet serpentine portion of the flow channel fluidly coupling to the outlet port, and
a sensor chamber fluidly coupling the inlet serpentine portion of the flow channel to the outlet serpentine portion of the flow channel, where the sensor chamber defines:
a planar region comprising a first planar region, a second planar region and a spit planar region, wherein the spit planar region is located between the first planar region and the second planar region, and wherein the spit planar region is in the same plane as that of the first planar region and the second planar region, an inlet ramp that transitions between a bottom of an inlet of the sensor chamber to a spit planar region, an outlet ramp that transitions between a bottom of an outlet of the sensor chamber to the spit planar region, side walls between the inlet ramp and the planar region, side walls between the outlet ramp and the planar region, where the sensor chamber is at least 3 times as wide as a width of the inlet serpentine portion of the flow channel and at least 3 times as wide as a width of the outlet serpentine portion of the flow channel, where an inlet portion and an outlet portion of the sensor chamber each define a radius at least 1.5 times the width of the inlet serpentine portion of the flow channel and the width of the outlet serpentine portion of the flow channel; and a sensor die located proximate to the spit planar region and configured to sense a measure related to a flow rate of a fluid flowing through the flow channel.

11. The flow sensor assembly of claim 10, further comprising a circuit board that is electrically coupled to the sensor die and sealingly coupled to the housing.

12. The flow sensor assembly of claim 11, further comprising an electrical circuit mechanically coupled to the circuit board and communicatively coupled to the sensor die and configured to output a fluid flow rate digital value.

13. The flow sensor assembly of claim 12, wherein the housing further defines a circuit chamber into which the electrical circuit is received when the circuit board is coupled to the housing.

14. The flow sensor assembly of claim 10, wherein the sensor chamber is at least 5 times as wide as the width of the inlet serpentine portion of the flow channel.

15. The flow sensor assembly of claim 14, wherein the flow channel is configured to confine at least 95% of the fluid that enters the inlet port flows through the sensor chamber.

16. The flow sensor assembly of claim 10, wherein the inlet ramp and the outlet ramp are at least 2 times the width of the inlet serpentine portion of the flow channel.

17. A flow sensor assembly, comprising:
a housing defining a flow channel comprising:
an inlet port,
an outlet port,
an inlet portion of the flow channel fluidly coupling to the inlet port,
an outlet portion of the flow channel fluidly coupling to the outlet port, and
a sensor chamber fluidly coupling the inlet portion of the flow channel to the outlet portion of the flow channel, where the sensor chamber defines:
a planar region comprising a first planar region, a second planar region, and a spit planar region, wherein the spit planar region is located between the first planar region and the second planar region, and wherein the spit planar region is in the same plane as that of the first planar region and the second planar region,
an inlet ramp that transitions between a bottom of an inlet of the sensor chamber to a spit planar region, an outlet ramp that transitions between a bottom of an outlet of the sensor chamber to the spit planar region, side walls between the inlet ramp and the planar region, side walls between the outlet ramp and the planar region, where the sensor chamber is at least 3 times as wide as a width of the inlet portion of the flow channel and at least 3 times as wide as a width of the outlet portion of the flow channel, and where flow path between the inlet port and the outlet port is via the sensor chamber; and
a sensor die located proximate to the spit planar region of the sensor chamber and configured to sense a measure related to a flow rate of a fluid flowing through the flow channel.

18. The flow sensor assembly of claim 17, wherein a depth of the inlet portion of the flow channel is at least 2 times the width of the inlet portion of the flow channel.

19. The flow sensor assembly of claim 17, wherein the inlet ramp is at least 2 times as wide as the inlet portion of the flow channel.

20. The flow sensor assembly of claim 17, wherein the sensor chamber is at least 5 times as wide as the width of the inlet portion of the flow channel.

* * * * *